(12) United States Patent
Rose et al.

(10) Patent No.: US 11,938,808 B2
(45) Date of Patent: Mar. 26, 2024

(54) OBSTRUCTION DESIGN

(71) Applicant: TISS LIMITED, Blackpool (GB)

(72) Inventors: Matthew Rose, Blackpool (GB);
Richard Forster, Blackpool (GB);
Ryan Wholey, Blackpool (GB)

(73) Assignee: TISS LIMITED, Blackpool (GB)

( * ) Notice: Subject to any disclaimer, the term of this patent is extended or adjusted under 35 U.S.C. 154(b) by 491 days.

(21) Appl. No.: 17/268,877

(22) PCT Filed: Aug. 16, 2019

(86) PCT No.: PCT/GB2019/052312
§ 371 (c)(1),
(2) Date: Feb. 16, 2021

(87) PCT Pub. No.: WO2020/035702
PCT Pub. Date: Feb. 20, 2020

(65) Prior Publication Data
US 2021/0323398 A1   Oct. 21, 2021

(30) Foreign Application Priority Data
Aug. 17, 2018  (GB) ...................................... 1813462

(51) Int. Cl.
*B60K 15/04* (2006.01)
*B60K 15/03* (2006.01)

(52) U.S. Cl.
CPC ............... *B60K 15/0403* (2013.01);
*B60K 2015/03289* (2013.01); *B60K 2015/03434* (2013.01)

(58) Field of Classification Search
CPC .............. Y10T 137/3331; B60K 15/04; B60K 15/0403; B60K 2015/03289; B60K 2015/03434

(Continued)

(56) References Cited

U.S. PATENT DOCUMENTS 1,922,930 A  *  8/1933  John .................. B60K 15/0403
                                                          220/86.3
1,931,335 A     10/1933  Terry
(Continued)

FOREIGN PATENT DOCUMENTS

DE    4342104 A1    6/1994
EP    2165873 A1    3/2010
(Continued)

OTHER PUBLICATIONS

International Search Report and Written Opinion for PCT Application No. PCT/GB2019/052312, dated Dec. 11, 2019.
(Continued)

*Primary Examiner* — Matthew W Jellett
(74) *Attorney, Agent, or Firm* — Foley & Lardner LLP

(57) ABSTRACT

There is provided an anti-siphon device for securing in a fluid tank inlet. The anti-siphon device comprises a housing, an inlet to the housing adapted to receive a fluid dispensing nozzle, the inlet at a proximal end of the hosing, and an outlet at a distal end of the housing. The anti-siphon device further comprises an obstruction disposed within the housing, where an outer surface of the obstruction and an inner wall of the housing define a first flow passageway. The obstruction comprises, a chamber disposed within the obstruction and configured to receive fluid, an inlet aperture in a first portion of the obstruction, and an outlet aperture in a second portion of the obstruction, where the inlet aperture, chamber, and outlet aperture define a second flow passageway, the second flow passageway being configured such that, in use, fluid can flow from the inlet aperture to the outlet aperture via the second flow passageway, whilst flows from the inlet to the outlet via the first flow passageway.

20 Claims, 5 Drawing Sheets

(58) Field of Classification Search
USPC .......................................... 137/218; 220/86.3
See application file for complete search history.

(56) References Cited

U.S. PATENT DOCUMENTS

| | | | | |
|---|---|---|---|---|
| 2,313,266 | A * | 3/1943 | Roberts | B60K 15/0403 220/86.3 |
| 2,421,350 | A * | 5/1947 | Odell | B60K 15/0406 220/86.3 |
| 3,036,594 | A | 5/1962 | Salisbury | |
| 3,880,214 | A * | 4/1975 | Slavin | B67D 7/36 251/149.6 |
| 3,951,297 | A * | 4/1976 | Martin | B60K 15/0403 220/86.3 |
| 4,345,694 | A | 8/1982 | Chambers | |
| 5,348,177 | A * | 9/1994 | Sung | B60K 15/04 220/86.2 |
| 5,813,432 | A | 9/1998 | Elsdon et al. | |
| 5,931,327 | A * | 8/1999 | Sung | B60K 15/04 277/607 |
| 6,257,287 | B1 * | 7/2001 | Kippe | B60K 15/03504 137/391 |
| 6,679,396 | B1 * | 1/2004 | Foltz | B60K 15/0406 141/301 |
| 7,584,766 | B2 * | 9/2009 | David | F16K 33/00 137/433 |
| 8,122,904 | B2 * | 2/2012 | Wholey | B60K 15/0403 220/86.3 |
| 9,809,111 | B1 | 11/2017 | Dana | |
| 2010/0193042 | A1 | 8/2010 | Keefer et al. | |
| 2011/0031245 | A1 | 2/2011 | Wholey | |

FOREIGN PATENT DOCUMENTS

| | | |
|---|---|---|
| GB | 2 406 333 A | 3/2005 |
| GB | 2 476 954 A | 7/2011 |
| WO | WO-2006/048659 A1 | 5/2006 |
| WO | WO-2007/110640 A1 | 10/2007 |
| WO | WO-2017/013433 A1 | 1/2017 |
| WO | WO-2017/158346 A1 | 9/2017 |

OTHER PUBLICATIONS

Search Report issued for United Kingdom Patent Application No. GB1813462.7, dated Jan. 22, 2019, 3 pages.

* cited by examiner

OBSTRUCTION DESIGN

CROSS-REFERENCE TO RELATED APPLICATIONS

This application is the U.S. National Stage of PCT Patent Application No. PCT/GB2019/052312, filed Aug. 16, 2019, which claims priority to and the benefit of GB Patent Application No. 1813462.7, filed Aug. 17, 2018, the entire disclosure of which is incorporated herein by reference.

TECHNICAL FIELD

The present invention relates to inlets for fluid tanks such as vehicle fuel tanks. In particular, the present invention relates to an anti-siphon inlet for a fluid tank such as a vehicle fuel tank.

BACKGROUND

The theft of fuel by siphoning from the fuel tanks of vehicles, and in particular commercial road vehicles, is a recognised problem. It is conventional to fit vehicles with a lockable fuel tank filler cap to prevent unauthorised access to the tank inlet. However, since the fuel filler cap is accessible it is vulnerable to tampering and can often be forced open by the determined thief. In addition, it is not always practical to fit a vehicle with a lockable fuel filler cap.

This problem has been addressed in the prior art by provision of a fluid tank inlet assembly incorporating structure to prevent insertion of a siphon tube into the tank. An example of an anti-siphon device is shown in PCT/GB2007/001126 and which is herein incorporated by reference in its entirety.

With reference to FIG. 1, which is taken from PCT/GB2007/001126, an anti-siphon device (also known as a fluid inlet assembly 1) for fitting to a fluid tank 10 is shown. The assembly 1 comprises a substantially straight body, or inlet pipe 5, an attachment means or mounting structure 2 at its proximal end and a grill or baffle plate 3 to permit the flow of liquid through the pipe 5 but block the passage of a siphon tube at its distal end. The grill 3 comprises a metal plate, provided with a plurality of fuel outlet holes 3a, which is securely attached across the internal width of the pipe 5.

The pipe 5 and grill 3 of the assembly are similar to that disclosed in the applicants other documents GB2406333 and WO2006048659. The mounting structure 2, which is provided for attaching the assembly to the inlet aperture 11 of the fuel tank 10, is similar to that of WO2006048659 but could take any appropriate form.

The fluid inlet assembly 1 also includes a float valve comprising a float ball 6 held within a float cage 7. The float ball 6 is a spherical hollow plastic ball. Thus, the float valve is arranged to allow the float ball 6 to be movable along the longitudinal axis of the assembly from an open position (as for instance shown in FIG. 1) to a closed position in which the ball is held against a valve seat 8 when fuel rises above a distal end of the assembly. The float valve may for instance be substantially the same as that shown in GB2406333 and WO2006048659 or may take another form.

It will be appreciated that, when the float valve is closed, it is still possible to fill the tank with further fuel as the fuel pressure entering the tank opens the valve against its buoyancy.

The inlet pipe 5 is provided with a plurality of vent outlets 9 spaced around its circumference adjacent to the mounting structure 2. These vents assist the filling of the tank by allowing air or other gaseous substance within the tank to escape the tank as it is displaced by fuel.

The inlet assembly 1 also includes an anti-tamper means 20 disposed between the end of the inlet pipe 5 and the float valve cage 7. The anti-tamper means comprises an obstruction 21 located within a housing 22 configured to prevent insertion of an elongate rigid member through the inlet pipe 5, through an aperture 3a in the grill 3, and into the float valve to displace the float member 6. The obstruction 21 has a double conical shape so that it is generally diamond shaped in cross-section as shown in FIG. 1. The housing 22 has a generally "bowled" internal radius to accommodate the obstruction 22 whilst maintaining an annular flow path 23 through which fuel can flow between the obstruction 1 and the inner wall of the housing 22 in order to reach the float valve, as shown by arrows A. The maximum diameter D of the obstruction 21 is greater than the diameter of the open end of the inlet pipe 5 and the inlet end of the float valve cage 7 (at valve seat 8) so that there is no direct line of sight from the inlet pipe 5 to the float valve member 6 past the obstruction 21. This prevents insertion of a straight rigid member through the inlet pipe 5, through an aperture 3a, and into the float cage 7 to displace the float member 6 away from the valve seat 8.

In addition, the housing 22 is provided with an internal annular lip 24 defined by its internal wall circumscribing a lower part of the obstruction 21 (below the maximum diameter portion of obstruction 21), and having a diameter less than the maximum diameter d of the obstruction 21.

This substantially prevents insertion of a flexible elongate member, such as a relatively thick but deformable wire, through the inlet pipe 5 and around the obstruction 21 into the float valve. This is because the inserted end of such a wire member will be deflected by the obstruction 21 in an outward direction towards the internal wall of the housing 22. Further insertion of the wire will then cause the inserted end of the wire to follow the contour of the internal wall of the housing 22 until the end of the wire is caught by the lip 24 preventing it from further insertion into the float valve chamber.

The inlet pipe 5, anti-tamper means 20, and float valve assembly 7, are separable components which may be screw threaded to one another. This allows ease of manufacture and assembly.

An alternative anti-siphon inlet assembly is disclosed in GB2476954, which is herein incorporated by reference in its entirety. The anti-siphon inlet of GB2476954 also makes use of an obstruction so as to prevent a malicious party inserting a tube into a fuel tank from the opening inlet of the anti-siphon, but differs from that shown in FIG. 1 in a number of ways, including that the anti-siphon inlet assembly disclosed in GB2476954 does not feature a float valve.

While an obstruction, such as the obstruction 21 shown in FIG. 1, is efficient at preventing unauthorised users from attempting to insert a pipe into the fuel tank, the presence of an obstruction can impede the flow of fluid into the tank. For example, with reference to FIG. 1, as fuel flows around the outside of the obstruction along flow passageway A, a pressure point is created in the region about point P, adjacent a distal end of the obstruction, where fuel entering the assembly 1 from its proximal end via the nozzle meets fuel that is rising upwards in the fuel tank. Such pressure points may be undesirable as they may result in splashback, or "backflow" during dispensation of fuel.

There remains a need to provide an improved obstruction which can, for example, reduce the risk or magnitude of backflow occurring during filing.

SUMMARY OF INVENTION

In an aspect of the invention there is provided an anti-siphon device for securing in a fluid tank inlet, comprising: a housing; an inlet to the housing adapted to receive a fluid-dispensing nozzle, the inlet being at a proximal end of the housing; an outlet at a distal end of the housing; an obstruction disposed within the housing, an outer surface of the obstruction and an inner wall of the housing defining a first flow passageway between the inlet and the outlet; the obstruction comprising: a chamber disposed within the obstruction, configured to receive fluid, an inlet aperture in a first portion of the obstruction; an outlet aperture in a second portion of the obstruction; the inlet aperture, chamber, and outlet aperture defining a second flow passageway between the inlet aperture and the outlet aperture.

Providing a second flow passageway which comprises a chamber in the obstruction can reduce pressure build up during dispensation of fluid into the fluid tank, particularly at a point adjacent a distal end of the obstruction, where a rising fluid level meets incoming fluid being pumped into the anti-siphon device via the fluid dispensing nozzle.

The fluid may be fuel and the fluid tank inlet may be a fuel tank inlet, such as that found in a vehicle.

The second flow passageway may be configured such that, in use, fluid can flow from the inlet aperture to the outlet aperture via the second flow passageway, whilst fluid flows from the inlet to the outlet via the first flow passageway. This is because the second flow passageway is arranged so that flow of fluid into the device, for example fluid that flows via the first flow passageway, does not oppose and prevent fluid flow through the second flow passageway.

The second flow passageway may adjoin the first flow passageway via the outlet aperture.

The second flow passageway may adjoin the first flow passageway at a location along the first flow passageway upstream of that of the inlet aperture.

The inlet aperture may be located at a distal portion of the obstruction, and may be configured to allow fluid to enter the chamber from the distal portion of the obstruction.

The outlet aperture may be located proximal to the inlet aperture, and may be configured to allow fluid within the chamber to flow from the chamber into the first flow passageway.

The second flow passageway may be configured such that as a fluid level rises during filing of the fluid tank with fluid, a portion of fluid from the fluid tank enters the chamber via the inlet aperture and exits the chamber via the outlet aperture into the first flow passageway.

The inlet aperture may have a cross sectional area which is greater than or equal to 75% of a maximum cross sectional area of the chamber.

The inlet aperture may have a diameter which is greater than or equal to 50% of the diameter of the inner wall of the housing. The inlet aperture may have a cross sectional area which is greater than or equal to 30% of the cross sectional area defined by the inner wall of the housing.

Cross sectional areas may be measured perpendicular to a longitudinal axis of the device and/or perpendicular to a direction of fuel flow through the device in use.

The inlet aperture may have the same diameter and/or cross sectional area as at least part of (and possibly all of) the chamber.

The chamber may be formed as a straight (blind) bore. The bore may extend along (or be coaxial with) the longitudinal axis of the device.

The outlet aperture may be located a distance less than or equal to 50% the length of the obstruction from the inlet aperture.

In some embodiments no outlet aperture is located a distance greater than or equal to 50% of the length of the obstruction from the inlet aperture.

The referred to length may be an axial length (e.g. a length measured along the longitudinal axis of the device).

The second portion of the obstruction may comprise one or more further outlet apertures such that there are a plurality of outlet apertures.

The plurality of outlet apertures may be arranged circumferentially about a surface of the obstruction.

The plurality of outlet apertures may be arranged axially along a surface of the obstruction.

The anti-siphon device may further comprise a bore in the obstruction. The bore may extend between the chamber and a portion of the outer surface of the obstruction.

The portion of the outer surface of the obstruction may be an apex of the obstruction.

The portion of the outer surface of the obstruction may be located at a proximal end of the obstruction.

A portion of the proximal end of the obstruction may define a baffle surface which is free from apertures.

The baffle surface may be defined by a surface of revolution of a line about an axis. The axis may be a longitudinal axis of the device. The line may be a convex line so that said baffle surface is domed. The baffle surface may rise to an apex. The apex may lie on the longitudinal axis of the device.

The anti-siphon device may further comprise a float valve assembly located downstream of the housing.

The or each outlet aperture may be arranged so that, in use, fluid which flows through the second flow passageway and out of the or each outlet aperture does not flow in a direction which has a component that opposes the flow of fluid through the first flow passageway.

The or each outlet aperture may be arranged so that, in use, the direction of fluid which flows through the second flow passageway and out of the or each outlet aperture is substantially perpendicular to the flow of fluid through the first flow passageway.

The plurality of outlet apertures may be radial outlet apertures. If there is only single outlet aperture, this may be a radial outlet aperture.

The inlet aperture may be an axial inlet aperture.

The chamber may be generally cylindrical.

The first portion of the obstruction may further comprise one or more of further inlet apertures, such that there are a plurality of inlet apertures.

BRIEF DESCRIPTION OF DRAWINGS

Specific embodiments of the present invention will now be described, by way of example only, with reference to the accompanying drawings, in which.

DETAILED DESCRIPTION

Figure 2:
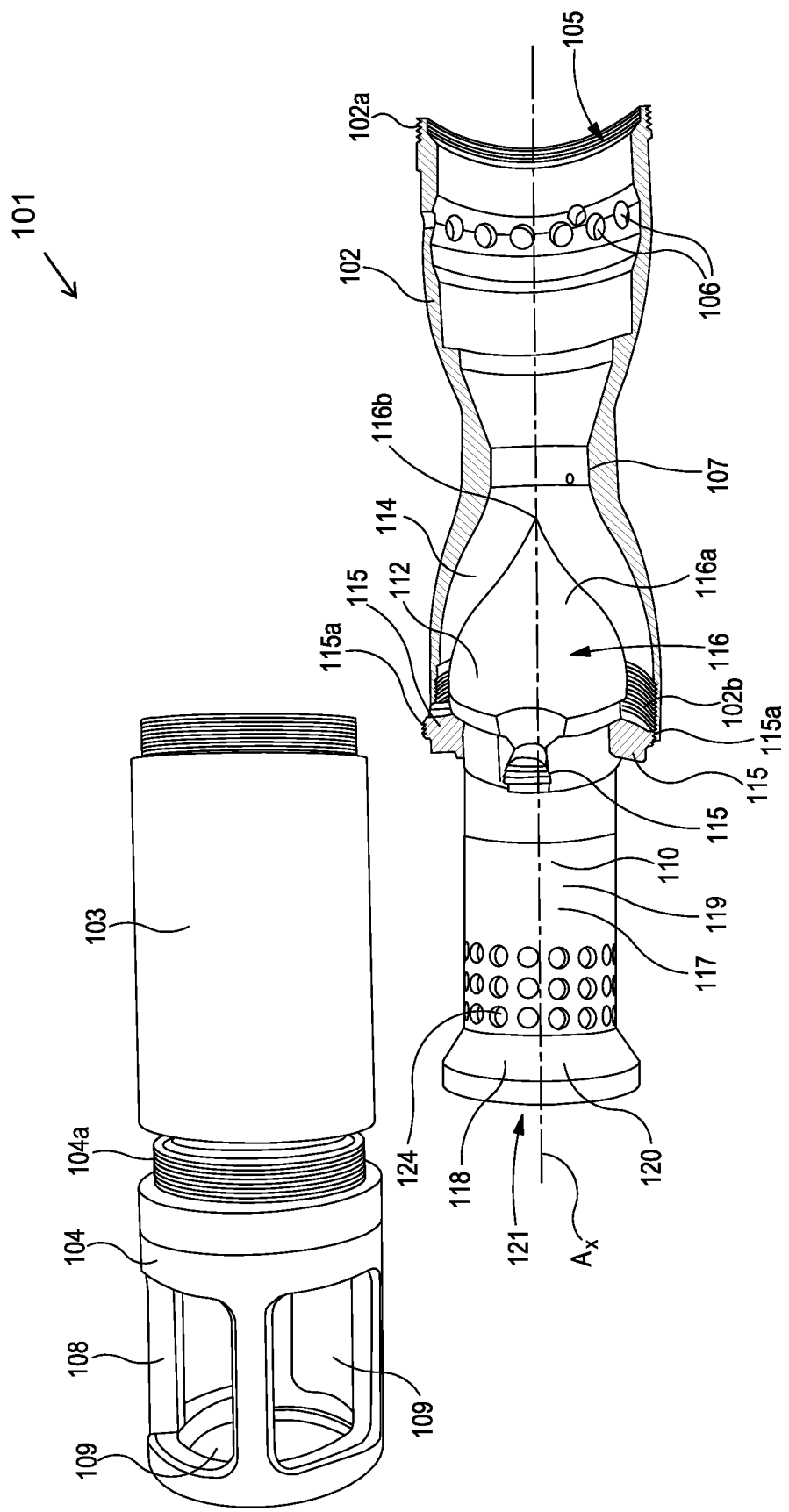
FIG. 2 is a side view of an anti-siphon device according to the present invention

FIG. 2 shows an anti-siphon device 101 according to an embodiment of the present invention. The anti-siphon device 101 is configured for use with an inlet aperture of a fluid tank, such as a vehicle fuel tank. The terms "inlet opening" and "inlet" may be used interchangeably with "inlet aperture". The term proximal as used herein is used to describe a position located towards the inlet aperture of the vehicle fuel tank, and the term distal as used herein is used to describe a position located away from the inlet aperture of the vehicle fuel tank. For example, during dispensing of fuel, fuel enters the proximal end of the anti-siphon device 101 by a fuel dispensing nozzle, travels distally through the anti-siphon device 101, and exits the anti-siphon device 101 at its distal end and into the fuel tank. The term, proximal direction, or proximally, is used herein to refer to a direction towards a proximal portion of the anti-siphon device (e.g. in a direction upstream with respect to the flow of fuel from the dispensing nozzle). The term, distal direction, or distally, is used herein to refer to a direction towards a distal portion of the anti-siphon device 1 (e.g. in a direction downstream with respect to the flow of fuel from the dispensing nozzle).

The anti-siphon device 101 comprises an inlet pipe 102, a housing 103 and a float valve assembly 104. In FIG. 2, the inlet pipe 102, housing 103 and float valve assembly 104 are shown in a disconnected state. Additionally, a float member of the float valve assembly has been omitted, and the inlet pipe 102 has been cut away to show the inside of the inlet pipe 102. The housing may be generally tubular, for example, a straight tube.

The inlet pipe 102, housing 103 and float valve assembly 104 can be assembled together using any appropriate method, e.g. screw threads on the corresponding components. For example, the inlet pipe 102 has a first screw thread 102a configured to engage with a corresponding screw thread on a mounting structure (not shown in FIG. 2), the mounting structure being for attaching the anti-siphon device 101 to an inlet aperture of a fuel tank. The inlet pipe 102 further comprises a second screw thread 102b configured to engage with a corresponding first screw thread 103a on the housing 103. The housing 103 has second screw thread (not shown in FIG. 2) which is configured to engage a corresponding first screw thread 104a on the float vale assembly 104.

When assembled, the anti-siphon device 101 has a generally elongated shape aligned along an axis Ax aligned generally parallel with the direction of fuel flow during dispensing.

It will be appreciated that, in other embodiments, the inlet pipe 102, housing 103 and float valve assembly 104 can be assembled together using appropriate joining method. In fact, in some embodiments, one or more of the inlet pipe 102, housing 103 and float valve assembly 104 may be integral with one another.

The inlet pipe 102 has an opening adapted to receive a fuel-dispensing nozzle at its proximal end 105. The inlet pipe 102 is provided with a plurality of vent outlets 106, which assist the filling of the fuel tank by allowing air or other gaseous substance within the tank to escape the fuel tank as it is displaced by fuel. The inlet pipe 102 has a constriction 107 which may have a diameter which is less than a diameter of a fuel-dispensing nozzle. The constriction 107 may prevent the fuel-dispensing nozzle from making contact with an obstruction 110 (described in more detail below). The constriction may also be positioned relative to the obstruction (e.g. centred on the longitudinal axis of the device, above the obstruction) so as to, in use, align fuel flow from the fuel-dispensing nozzle with the obstruction (for example, with an apex of the obstruction).

Figure 1:
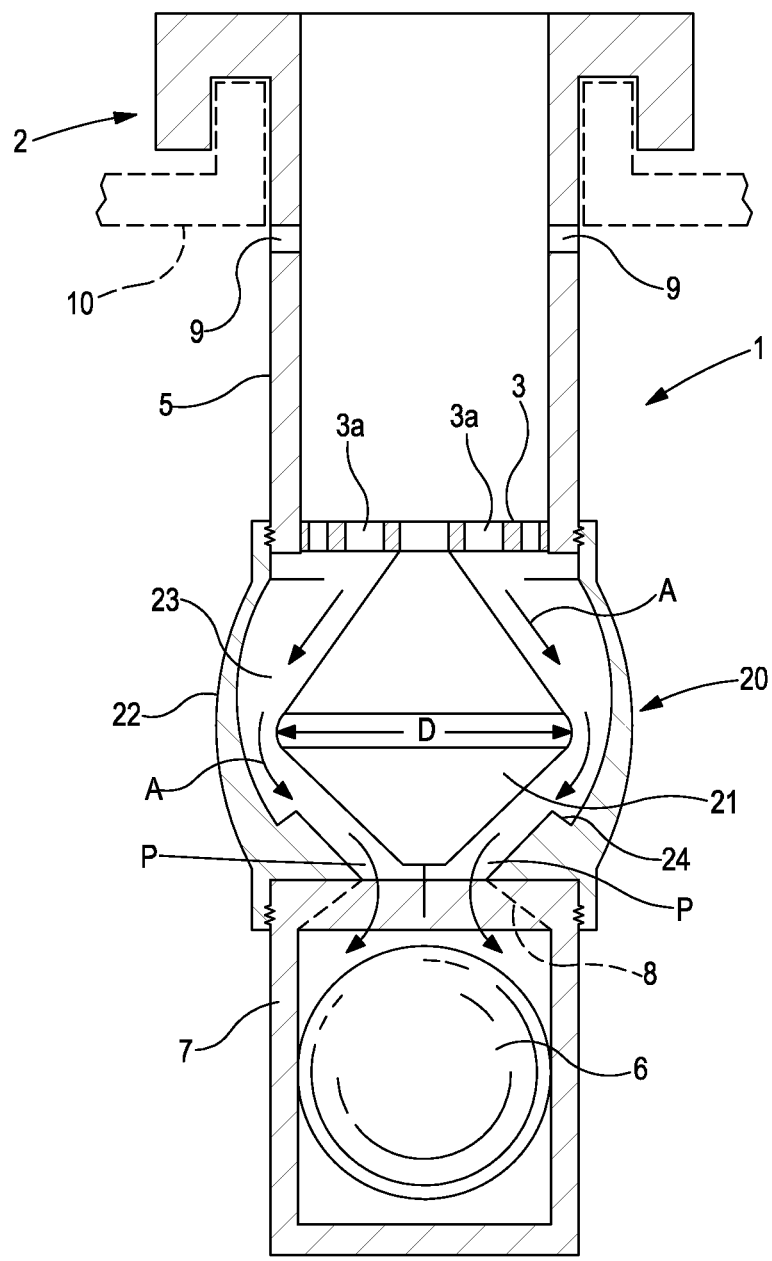
FIG. 1 is a side view of a prior art anti-siphon device.

The float valve assembly 104 operates in the same manner as a standard float valve assembly such as that shown in FIG. 1, and acts to provide a seal between the fuel in the fuel tank and the outside environment when the fuel level is sufficiently high. The float value assembly 104 comprises a cage portion 108 in which a float member (not shown) resides. As is well known in the art, the float member may take the form of a ball which is buoyant in the fluid. Of course, any other known type of float valve assembly may be used. The cage portion 108 has a number of outlets 109 which allow fuel which has been dispensed from the nozzle, and has passed through the anti-siphon device 1 and the float member, to leave the anti-siphon device 1 and enter the fuel tank.

Figure 3:
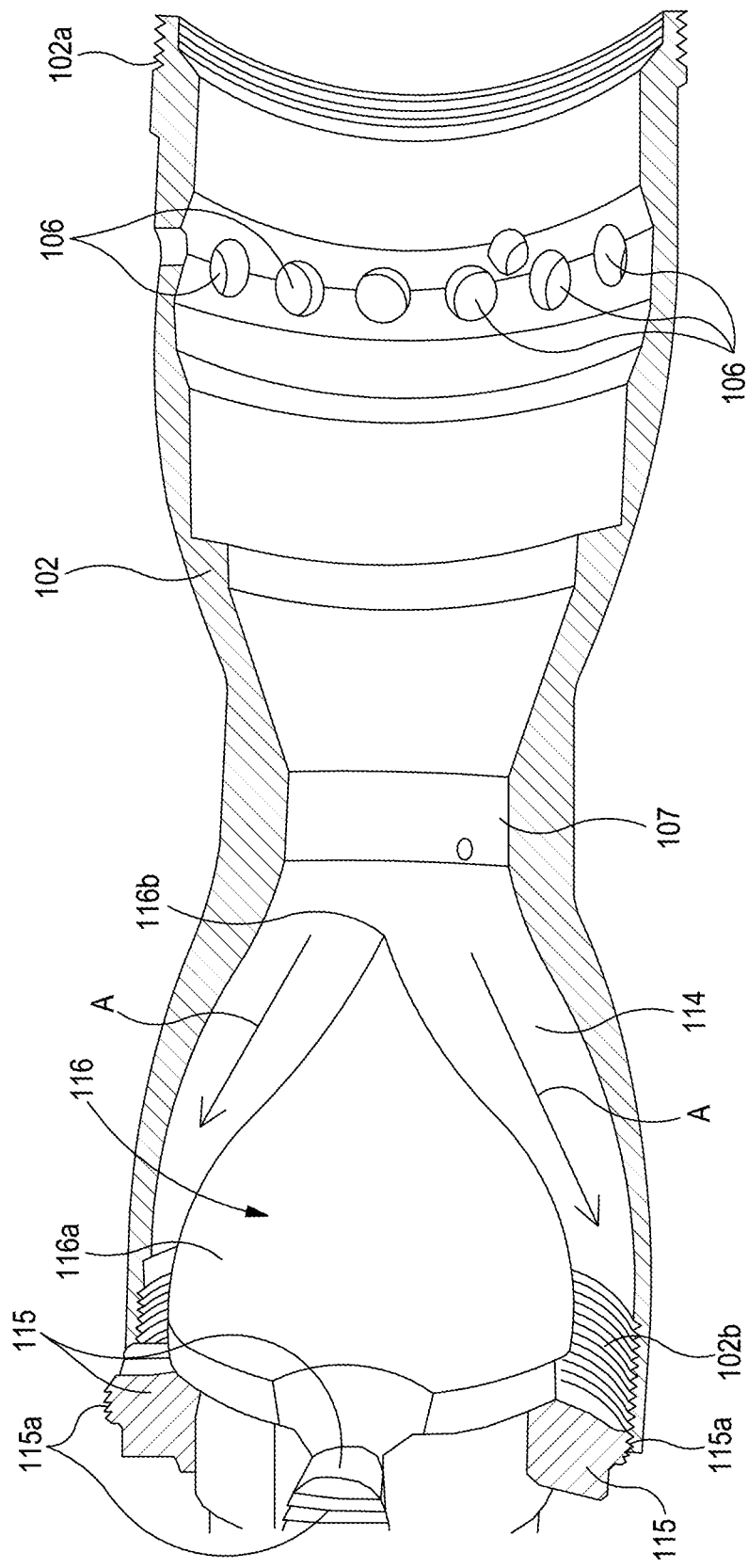
FIG. 3 is an enlarged view of an inlet pipe of the anti-siphon device of FIG. 2.

The anti-siphon device 101 further comprises an obstruction 110. In the implementation shown in FIG. 2, the obstruction 110 is configured to be substantially disposed within the housing 103, with a proximal portion 116 of the obstruction 110 being disposed within the inlet pipe 102. An outer surface 116a of the obstruction 110, along with an inner surface 113 (see FIG. 4) of the housing 103 and an inner surface 114 of the inlet pipe 102, define a flow passageway A (see FIGS. 3 and 4) in the form of an annulus, through which fuel may be pumped into the fuel tank. The obstruction 110 attaches to the inlet pipe 102 via four radially extending attachment portions 115 (only three are shown in FIG. 2) having screw threads 115a which are configured to engage with the second screw thread 102b of the fluid inlet pipe 102, such that the obstruction 110 may be screwed into, and held in place by, the inlet pipe 102. However, it will be appreciated that the obstruction 110 may be mounted within the anti-siphon device 101 using any suitable method.

The obstruction 110 is generally circular in cross section (in a plane perpendicular to the axis Ax of the anti-siphon device 101) and is elongated along the axis Ax of the anti-siphon device 101. The obstruction 110 comprises the proximal portion 116, mid portion 117 and distal portion 118 (the mid portion 117 being interposed between the proximal portion and the distal portion), where, as described above, the proximal portion 116 is disposed in the inlet pipe 102 and the mid portion 117 and distal portion 118 are disposed in the housing 103.

In some embodiments the obstruction may be formed as a single piece. In other embodiments the obstruction may be formed from separate components. For example, the obstruction may be formed of two parts: a first part comprising the proximal portion and a second part comprising the mid portion and the distal portion. The separate parts forming the obstruction may be secured to one another in any appropriate manner. For example, the separate parts may be screwed together.

The proximal portion 116 comprises a generally curved outer surface 116a (or baffle surface). The baffle surface is free from apertures. The baffle surface gets narrower towards its proximal end and terminates at an apex 116b. The apex lies on the longitudinal axis of the device. The curved surface is a surface of revolution of a generally curved line about an axis. In the embodiment described the axis is the longitudinal axis of the device, although it may be any other appropriate axis. The curved line may be a generally convex line such that the baffle surface is domed. In the implementation shown, the curved outer surface 116a is generally convex, with a concave portion at its proximal end. The curved outer surface 116a allows fuel to flow past the obstruction 110 without difficulty during dispensing of fuel, and reduces turbulence generated within the fuel whilst doing so.

The curved outer surface 116a follows a similar contour to the inner surface 114 of the inlet pipe 102, adjacent the curved outer surface 116a, and defines a part of the flow passageway A for fuel to flow through.

The mid portion 117 has an outer surface 119 which runs parallel to the axis Ax of the anti-siphon device 101, and, along with an inner surface 113 (shown in FIG. 4, which shows a cut-away view of a portion of the obstruction 110) of the housing 103, defines a further portion of the flow passageway A.

The distal portion 118 has an outer surface 120 which is generally tapered so as to taper outward (away from the axis Ax of the anti-siphon device 101), the taper increasing the diameter of the distal portion 118 in the distal direction. The outer surface 120, along with the inner surface 113 of the housing 103, further defines a portion of the flow passageway A. Given that the outer surface 120 of the distal portion 118 tapers outward such that the diameter of the distal portion 118 increases in the distal direction, the separation between the outer surface 120 and the inner surface 113 of the housing 103 decreases, thereby decreasing a cross-sectional area of the flow passageway A.

The purpose of tapering is to prevent anyone putting rigid or flexible wires down the side of the device to try and tamper with the float valve assembly 104. If a wire is forced down the outside of the obstruction it will hit the taper and be directed outwards towards the side of the housing 103 and away from the float-valve assembly.

It has also been found that, counter-intuitively, the taper assists in guiding fuel flow around the obstruction, which results in greater possible fuel flow rates through the device. This is contrary to the conventional thinking that a straight flow of fuel (e.g. parallel to the longitudinal axis of the device) would be more effective at maximising the flow rate of fuel through the device.

Figure 4:
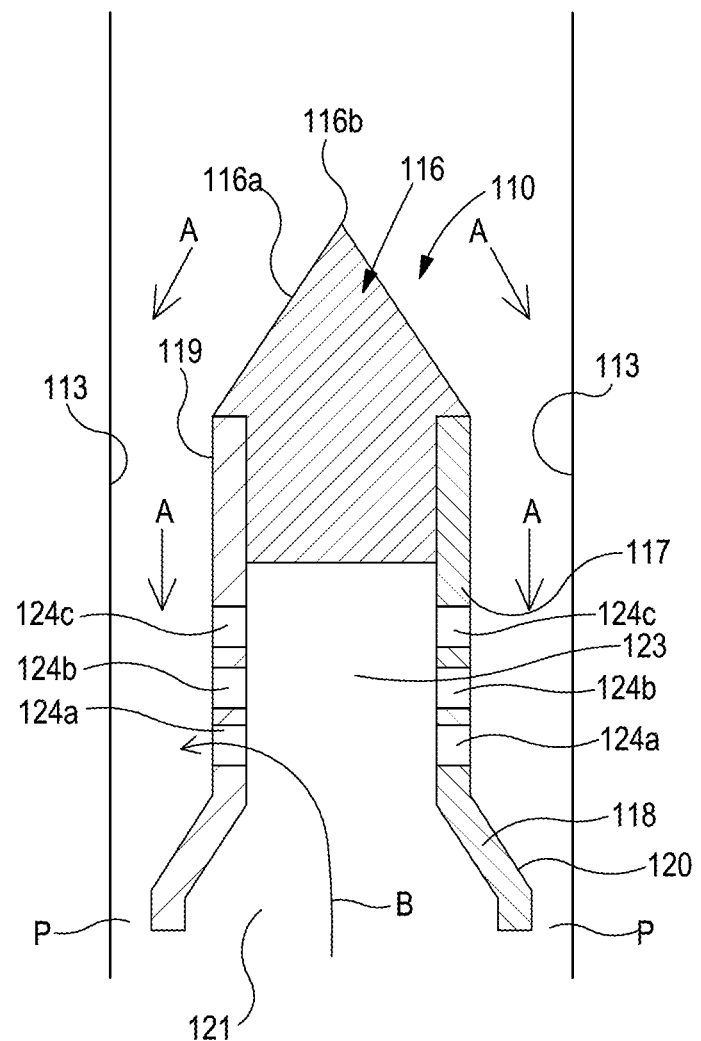
FIG. 4 is an enlarged schematic cross section of an obstruction and housing of the anti-siphon device of FIG. 2.
Figure 5:
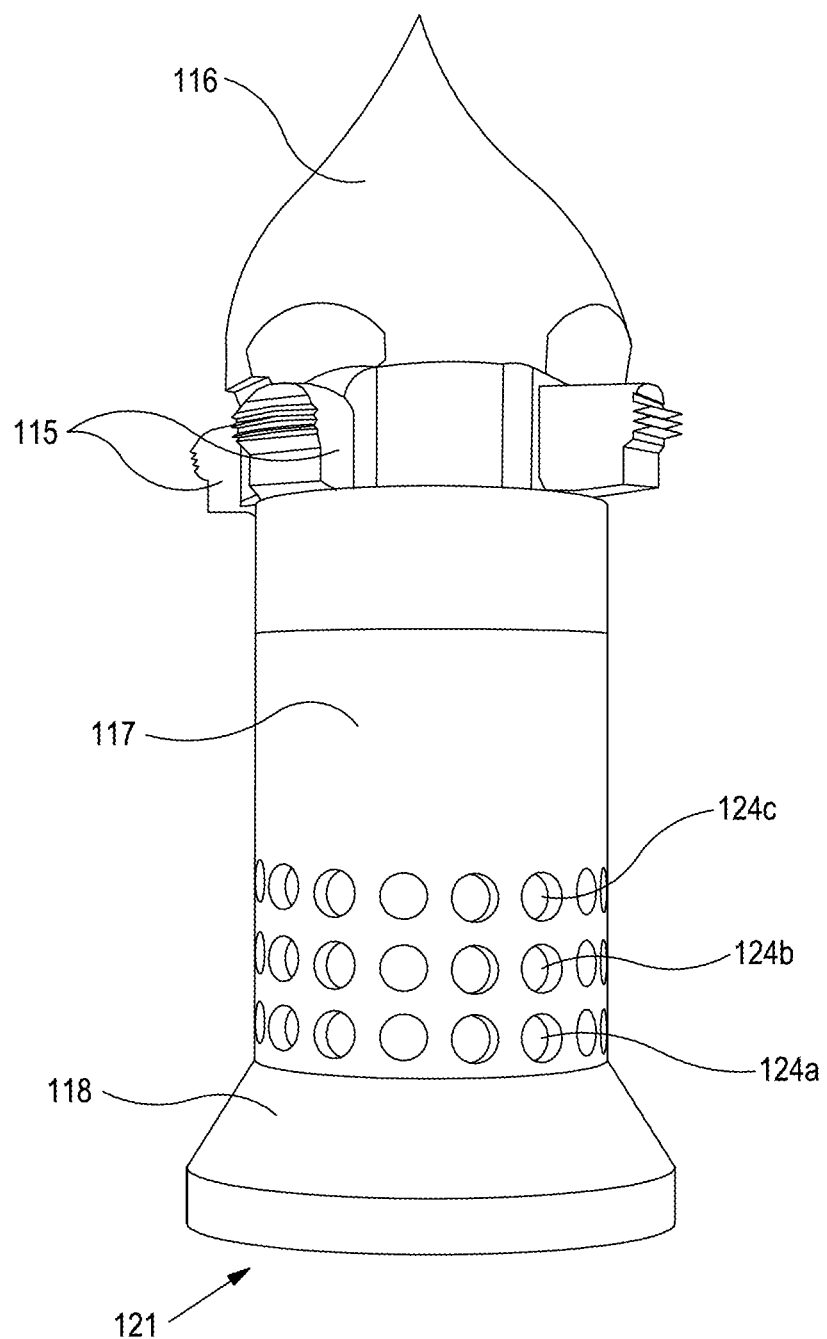
FIG. 5 is a side view of the obstruction shown in FIG. 2.

As seen best in FIG. 4, the obstruction 110 comprises an inlet aperture 121, chamber 123 and plurality of outlet apertures 124. The inlet aperture 121 is located at the most distal point of the distal portion 118, and provides an opening, or inlet, to the chamber 123 such that fuel from the fuel tank can flow into the chamber 123 through the inlet aperture 121. The inlet aperture 121 may be relatively large in diameter as compared to the diameter of one of the outlet apertures. For example, the inlet aperture 121 may have a diameter substantially similar to a diameter of the chamber 123, such that the obstruction may be described as having an open or hollow bottom portion. The inlet aperture may have a cross sectional area which is greater than or equal to about 75% of the maximum cross sectional area of the chamber.

In the embodiment of the invention shown, the chamber 123 is formed as a straight (blind) bore. The bore extends along (and is coaxial with) the longitudinal axis of the device. In this manner the inlet aperture has the same diameter and cross sectional area as the entire chamber.

Cross sectional areas may be measured perpendicular to a longitudinal axis of the device and/or perpendicular to a direction of fuel flow through the device in use.

In one embodiment the inlet aperture has a diameter of about 30 mm and the diameter of the inner wall of the housing is about 55 mm. As such the diameter of the inlet aperture is about 55% of that of the inner wall of the housing. It has been found that when the diameter of the inlet aperture is greater than or equal to about 50% of that of the inner wall of the housing, flow of fuel through the device is enhanced. In equivalent terms, the inlet aperture may have a cross sectional area which is greater than or equal to about 30% of the cross sectional area defined by the inner wall of the housing.

The inlet aperture 121 is located adjacent a distal end of the annulus defining flow passageway A. For example, as shown in FIG. 4, the inlet aperture 121 is adjacent a point P at which the annulus defined by the outer surface 120 of the distal portion 118 of the obstruction 110 and the inner surface 113 of the housing 103 terminates.

The inlet aperture 121 may be formed by the absence of a wall along the distal end of the obstruction 110. That is, the inlet aperture 121 may define an open end leading into the chamber 123. The inlet aperture 121 may therefore have the same or substantially similar diameter to the diameter of the chamber, or an opening of the chamber 123. It is advantageous to have a relatively large inlet aperture 121 so as to reduce any restriction to the flow of the fuel into the chamber. In an alternative arrangement, a plurality of inlet apertures may be used.

The plurality of outlet apertures 124 are located proximal from the inlet aperture 121. That is, the plurality of outlet apertures 124 may be described as being "upstream" (with regard to the direction of fluid flow through the flow passageway A) of the inlet aperture 121. The plurality of outlet apertures 124 are formed in the mid portion 117 of the obstruction 110. In the implementation shown in FIG. 2, the plurality of outlet apertures 124 are formed towards a distal end of the mid portion 117, and are in the form of holes in through the mid portion 117. The plurality of outlet apertures 124 provide an outlet which connects the chamber 123 to the flow passageway A such that fuel may flow out of the chamber 123 and into the flow passageway A. The output apertures 124 may be described as being radial outlet apertures, in that they provide for radial flow of fluid out of the chamber 123. The inlet aperture 121, chamber 123, and outlet aperture 124 form flow passageway B (shown in FIG. 4), in which fluid can flow from below the anti-siphon device (e.g. from the fuel tank) and into (an upstream portion of) flow passageway A, as described in more detail below.

As is shown in FIG. 2, the outlet apertures 124 are circumferentially and axially distributed about and along a portion of the housing. Other embodiments may include any appropriate number/arrangement of outlet apertures. For example, the outlet apertures may be only circumferentially or axially distributed about or along a portion of the housing.

Distributing the outlet apertures 124 circumferentially helps the fuel in the chamber 123 to flow into the flow passageway A in an evenly distributed manner. This can help reduce turbulence in the flow though flow passageway A. It may also reduce turbulence at pressure point (or pinch point) P.

Distributing a number of the outlet apertures 124 axially provides for improved flow characteristics. Three layers of outlet apertures 124 are shown in FIG. 4, a first layer 124a, second layer 124b and third layer 124c. Thus, as the fuel level continues to rise and reach additional layers of outlet apertures 124, more fuel gradually flows through the additional second flow passageways B that are formed. Gradually increasing the amount of fuel which enters the flow passageway A further improves the flow through the flow passageway A.

In some embodiments a bore (or breather hole) may extend from the chamber to an external surface of the obstruction, for example, at the proximal end of the obstruction. In some embodiments the breather hole may be axial. In some embodiments the breather hole may extend from the chamber to an apex of the obstruction. The breather hole may facilitate the release of air from within the chamber 123 as the fuel level in the chamber rises. The diameter of the bore is significantly smaller than the diameter of either the inlet aperture 121 or the outlet apertures 124, since the bore is configured to allow air to escape rather than allow fuel to flow freely through the bore and into the chamber 123. In other embodiments the breather hole may have a different configuration and/or location provided it can allow air within the chamber to escape. In some embodiments, given the breather hole is not essential to the invention, it may be omitted entirely.

There will now be described an operation of the anti-siphon device 101 when secured in a fuel tank inlet.

A user wishing to fill the fuel tank with fuel inserts a fuel dispensing nozzle into the inlet pipe 102 of the anti-siphon device mounted in the fuel tank inlet and starts to dispense the fuel from the fuel dispensing nozzle. The fuel enters the inlet pipe 102 and travels distally along the inlet pipe 102, meeting the proximal portion 116 of the obstruction 110. The curved outer surface 116a of the proximal portion 116 helps guide the fuel around the obstruction 110 and along flow passageway A. The fuel is guided about the mid portion 117 and distal portion 118 of the obstruction 110 and into the float valve assembly 104, where the fuel passes the valve member and exits the float valve assembly 104 and enters the fuel tank via the outlets 109 of the cage 108.

As fuel is dispensed, the quantity of fuel in the fuel tank increases, which raises the height of the level of fuel. The fuel level will reach, and subsequently enter, the anti-siphon device 101 before the tank has been filled. In prior art anti-siphon devices, when the rising fuel level reaches a region around the distal portion 118 of the obstruction 110, the rising fuel begins to enter flow passageway A. That is, fuel enters flow passageway A in the proximal direction and against the flow of the fuel travelling distally through the flow passageway A from the fuel-dispensing nozzle. This can cause a pressure point in the region around the distal portion 118 of the obstruction 110 (point P in FIG. 4) leading to "backflow". This can result in turbulence in the fluid flowing through the device and/or a reduction in the rate of fluid throughput. As such this may result in increased filling time for the tank. In addition "backflow" may result in the fuel-dispensing nozzle automatically cutting off the supply of fuel. If this occurs it may mean that the fuel tank cannot be sufficiently filled. However, such problems are mitigated or obviated by the inlet aperture 121, chamber 123 and second apertures 124 of the obstruction 110.

At the point where the rising fuel level reaches the distal portion 118 of the obstruction 110, a portion of the rising fuel level enters the inlet aperture 121 of the obstruction 110 and enters into the chamber 123, thus relieving any pressure build up at point P. As the fuel level continues to rise, it reaches the first level 124a of outlet apertures 124 such that the fuel may flow out of the chamber 123 and into the flow passageway A. Additionally, as the flow of fuel from the dispensing nozzle is flowing relatively quickly along passageway A, the flowing fuel in passageway A can act to pull fuel which is inside the chamber 123 out into flow passageway A, further facilitating the flow of fluid along passageway B.

Therefore, when the level of fuel within the chamber 123 reaches the level of the first level of the outlet apertures 124a, a plurality of additional flow passageways B are formed by the inlet aperture 121, chamber 123, and the plurality of first level outlet apertures 124a, through which fuel which has already been dispensed in the fuel tank can flow into the obstruction 110 and back into the flow passageway A (only one flow passageway B is shown in FIG. 4). As the fuel level continues to rise, the fuel level will reach the second level of the outlet apertures 124b, and will begin to flow out of the second level of the outlet apertures 124b (in addition to the first level outlet apertures) and into the flow passageway A. As the fuel level continues to rise further, the fuel level will reach the third level of the outlet apertures 124c, and will begin to flow out of the third level of the outlet apertures 124c (in addition to the first and second level outlet apertures) and into the flow passageway A. It will of course be appreciated that the anti-siphon device 101 may not be aligned perpendicular to the horizontal when secured in an fuel tank inlet of a fuel tank, e.g. may be at an angle to the horizontal, and so fluid may enter the (some of) the second level (and/or third level) of outlet apertures 124b before all of the first level outlet apertures 124a are fully submerged by fuel.

By providing one or more flow passageways B, there is a reduced chance of "backflow" when the fluid level reaches the distal portion 118 of the obstruction 110.

As previously discussed, the second outlet apertures are generally radial. Given that the direction of fuel flow through flow passageway A at the portion of the flow passageway A which is adjoined by the second outlet apertures is generally axial, the direction of fuel flowing out of the outlet apertures into the flow passageway A is generally perpendicular to direction of fuel flowing through the flow passageway A. As such, the flow of fuel through the flow passageways B does not oppose the flow of fuel through flow passageway A, thereby enabling a greater flow rate of fuel through flow passageway A and hence the anti-siphon device. In the present embodiment, the direction of fuel flowing out of the outlet apertures into the flow passageway A is generally perpendicular to the direction of fuel flowing through the flow passageway A. In other embodiments, the angle between the direction of fuel flowing out of the outlet apertures into the flow passageway A and the direction of fuel flowing through the flow passageway A may be any appropriate angle, provided that, in use, fluid which flows out of the outlet apertures does not flow in a direction which has a component that opposes the flow of fluid through the first flow passageway A.

There is a trade-off between the need to provide an obstruction having a smooth outer surface for fuel to flow distally unencumbered, and the need to provide a number of outlet apertures 124. It can therefore be advantageous to limit the number of outlet apertures 124 such that only a predetermined fraction of the axial length of the obstruction 110 comprises the outlet apertures 124. In an implementation, the final layer of outlet apertures 124 may be located a distance of about half of the length of the obstruction from the distal end of the obstruction 110. In an implementation, the final layer of outlet apertures 124 may be located a distance of about quarter of the length of the obstruction from the distal end of the obstruction 110. The outlet apertures 124 may also generally extend axially along the obstruction only as far as the chamber 123 extends axially within the obstruction.

In general, it has been found that it is beneficial for the performance of the device for the (one or more) outlet apertures to be located at the distal end of the obstruction. In particular it is preferable that no outlet aperture is located greater than a distance of about half of the length of the obstruction from the distal end of the obstruction 110. More preferably, no outlet aperture may be located greater than a distance of about a third or a quarter of the length of the obstruction from the distal end of the obstruction 110.

While it has been described that the inlet pipe 102, housing 103 and float valve assembly 104 connect to one another via screw threads, it will be appreciated that any suitable connection means may be used. Alternatively, the inlet pipe 102, housing 103 and float valve assembly 104, or any combination thereof, may be integrally formed, or formed from a single piece of material.

While a plurality of outlet apertures 124 has been described, in some implementations there may be only one outlet aperture.

While a float valve assembly has been described, it will be appreciated that the obstruction 110 may be applied to other anti-siphon devices without float valve assemblies, such as that described in GB2476954.

While the inlet pipe has been described as having a constriction, it will be appreciated that this need not be the case in all implementations.

While the obstruction 110 has been described as being substantially disposed within the housing 103, with a proximal portion 116 of the obstruction 110 being disposed within the inlet pipe 102, it will be appreciated that all of the obstruction 110 may be disposed within the housing.

While a housing 103 and inlet pipe 102 have been described, these may be one and the same component.

While the description has described the anti-siphon device being used in the context of filing a fuel tank with fuel, such as petrol or diesel, it will be appreciated that the anti-siphon device may be used with any fluid.

Furthermore, while the description relates to a separate anti-siphon device which is mounted within a fluid tank inlet, in other embodiments the anti-siphon device may be integral with the fluid tank inlet. For example, the fluid tank inlet may be a separate part to the fluid tank itself, the fluid tank inlet having the anti-siphon device integrated therewith, such that the fluid tank inlet can be mounted to the fuel tank itself with the anti-siphon device in situ.

Although not shown in the figures, an anti siphon device according to the present invention may comprise an attachment means or mounting structure 2, to mount the anti siphon device within the fluid inlet. For example, the attachment means or mounting structure 2 may be located at the proximal end of the device. Such attachment means may take any appropriate form. For example, it may take the form of a collar like that shown in WO2007110640 or a snap-ring type arrangement such as that discussed in WO2017158346.

Although specific embodiments of the invention have been described above, it will be appreciated that various modifications can be made to the described embodiments without departing from the spirit and scope of the present invention. That is, the described embodiments are to be considered in all respects exemplary and non-limiting.

The invention claimed is:

1. An anti-siphon device for securing in a fluid tank inlet, the anti-siphon device defining a longitudinal axis and comprising:
   a housing;
   an inlet to the housing adapted to receive a fluid-dispensing nozzle, the inlet being at a proximal end of the housing;
   an outlet at a distal end of the housing;
   an obstruction disposed within the housing, an outer surface of the obstruction and an inner wall of the housing defining a first flow passageway between the inlet and the outlet;
   the obstruction comprising:
      a chamber disposed within the obstruction, configured to receive fluid,
      an inlet aperture in a first portion of the obstruction;
      an outlet aperture in a second portion of the obstruction;
      a proximal portion having a generally curved outer surface terminating at an apex lying on the longitudinal axis;
      a mid-portion defining an outer surface which runs parallel to the axis; and
      a distal portion having an outer surface which is generally tapered, the taper increasing the diameter of the distal portion in a distal direction along the longitudinal axis;
   the inlet aperture, chamber, and outlet aperture defining a second flow passageway between the inlet aperture and the outlet aperture, the second flow passageway being configured such that, in use, fluid can flow from the inlet aperture to the outlet aperture via the second flow passageway, whilst fluid flows from the inlet to the outlet via the first flow passageway.

2. The anti-siphon device of claim 1, wherein the second flow passageway adjoins the first flow passageway via the outlet aperture.

3. The anti-siphon device of claim 1, wherein the second flow passageway adjoins the first flow passageway at a location along the first flow passageway upstream of that of the inlet aperture.

4. The anti-siphon device of claim 1, wherein the inlet aperture is located at a distal portion of the obstruction, and is configured to allow fluid to enter the chamber from the distal portion of the obstruction.

5. The anti-siphon device of claim 1, wherein the outlet aperture is located proximal the inlet aperture, and is configured to allow fluid within the chamber to flow from the chamber into the first flow passageway.

6. The anti-siphon device of claim 1, wherein the second flow passageway is configured such that as a fluid level rises during filing of the fluid tank with fluid, a portion of fluid from the fluid tank enters the chamber via the inlet aperture and exits the chamber via the outlet aperture into the first flow passageway.

7. The anti-siphon device of claim 1, wherein the inlet aperture has a cross sectional area which is greater than or equal to 75% of a maximum cross sectional area of the chamber.

8. The anti-siphon device of claim 1, wherein the inlet aperture has a diameter which is greater than or equal to 50% of a diameter of the inner wall of the housing.

9. The anti-siphon device of claim 1, wherein the inlet aperture has a cross sectional area which is greater than or equal to 30% of a cross sectional area defined by the inner wall of the housing.

10. The anti-siphon device of claim 1, wherein no outlet aperture is located a distance greater than or equal to 50% of a length of the obstruction from the inlet aperture.

11. The anti-siphon device of claim 1, wherein the second portion of the obstruction comprises one or more further outlet apertures such that there are a plurality of outlet apertures.

12. The anti-siphon device of claim 11, wherein the plurality of outlet apertures are arranged axially along a surface of the obstruction.

13. The anti-siphon device of claim 1, wherein a portion of a proximal end of the obstruction defines a baffle surface which is free from apertures.

14. The anti-siphon device of claim 1, further comprising a float valve assembly located downstream of the housing.

15. The anti-siphon device of claim 1, wherein the or each outlet aperture is arranged so that, in use, fluid which flows through the second flow passageway and out of the or each outlet aperture does not flow in a direction which has a component that opposes the flow of fluid through the first flow passageway.

16. The anti-siphon device of claim 1, wherein the or each outlet aperture is arranged so that, in use, the direction of fluid which flows through the second flow passageway and out of the or each outlet aperture is substantially perpendicular to the flow of fluid through the first flow passageway.

17. The anti-siphon device of claim 1, wherein the plurality of outlet apertures are radial outlet apertures.

18. The anti-siphon device of claim 1, wherein the inlet aperture is an axial inlet aperture.

19. The anti-siphon device of claim 1, wherein the chamber is generally cylindrical.

20. The anti-siphon device of claim 1, wherein the first portion of the obstruction further comprises one or more of further inlet apertures, such that there are a plurality of inlet apertures.

\* \* \* \* \*